United States Patent [19]
Adamson

[11] Patent Number: 4,586,428
[45] Date of Patent: May 6, 1986

[54] COOKING APPARATUS FOR TWO-SIDED COOKING

[75] Inventor: Lee E. Adamson, Roscoe, Ill.

[73] Assignee: Special Equipment Companies, Inc., Taylor Freezer Division, Rockton, Ill.

[21] Appl. No.: 768,355

[22] Filed: Aug. 22, 1985

[51] Int. Cl.$^4$ .......................... A47J 27/62; A47J 37/06
[52] U.S. Cl. ........................................ 99/332; 99/349; 99/378; 99/379
[58] Field of Search ................. 99/349, 331, 332, 372, 99/379, 374, 380, 378; 426/523

[56] References Cited
U.S. PATENT DOCUMENTS

| | | |
|---|---|---|
| 2,009,791 | 7/1935 | Shroyer . |
| 2,632,379 | 3/1953 | Kudo . |
| 3,799,047 | 3/1974 | Freeman ............................ 99/374 X |
| 4,088,067 | 5/1978 | Kaebitzsch et al. . |
| 4,165,682 | 8/1979 | Weise . |
| 4,444,094 | 4/1974 | Baker et al. . |
| 4,483,239 | 11/1984 | Mueller et al. . |

*Primary Examiner*—Billy J. Wilhite
*Attorney, Agent, or Firm*—Vernon J. Pillote

[57] ABSTRACT

A clamshell type grill having an upper cooking platen mounted on a platen support arm for swinging movement between a lower cook position overlying a lower cooking platen and a raised position inclined upwardly from the lower cooking platen. The upper platen is manually operable to its lower cook position in which an arm stop in the arm engages an arm stop abutment and a pneumatic clamp cylinder is arranged to press and hold the platen support arm in its lower cook position. The upper platen is mounted on the platen support arm for limited floating movement in a direction perpendicular to the upper platen and adjustable platen stops on the platen support arm are arranged to engage platen stop abutments on the upper platen to limit downward movement of the upper platen to a preset lower position relative to the platen support arm and thereby control spacing of the upper platen from the lower platen.

10 Claims, 6 Drawing Figures

COOKING APPARATUS FOR TWO-SIDED COOKING

BACKGROUND OF THE INVENTION

Single surface grills are widely used in commercial food service establishments for cooking a wide variety of food products. Some food products such as hamburger patties require cooking on both sides and, in single surface grills, it is necessary for the operator to turn the patties after they have been cooked on one side for cooking on the second side. This increases the overall cooking time and the amount of operator attention required for cooking such food products. In addition, some food products such as hamburger patties tend to shrivel and curl during one-sided cooking, unless a restraining pressure is applied to the upper side of the food product. When the food product shrivels or curls during cooking, the contact area between the food product and the cooking surface is reduced and this adversely affects uniformity of cooking of the food product and the appearance of the cooked food product.

Cooking apparatus have heretofore been made with upper and lower cooking platens for two-sided cooking of food products such as hamburger patties. Two-sided cooking apparatus generally reduce the overall cooking time and amount of operator attention required for cooking the hamburger patties. However, there are a number of interrelated problems encountered in two-sided cooking apparatus that are not encountered in single surface grills.

The upper cooking platen in two-sided cooking apparatus for commercial food service establishments are generally large enough to enable cooking of a number of individual hamburger patties at the same time. The hamburger patties are preformed in several different nominal sizes and thicknesses and are commonly frozen for storage and transportation. The frozen patties are relatively rigid when initially placed on the lower cooking platen and if the upper platen rests only on the thickest patty or patties, even small differences in the thickness of the patties in the group being cooked could delay good heat transmitting contact between the upper platen and some of the thinner patties and result in uneven cooking of the patties. On the other hand, the patties soften and shrink or decrease in thickness as they thaw and cook. The weight of the upper cooking platen, if unrestrained or controlled, is such that it could excessively compress or compact the hamburger patties and adversely affect the texture and appearance of the cooked patties. Thus, two-sided cooking apparatus present several special problems including accommodating variations in initial thickness of the individual patties in the group being cooked; accommodating the decrease in thickness of the patties that occurs during cooking; preventing excessive compaction of the patties; and accommodating different groups of patties of nominally different thickness. In addition, in two-sided cooking apparatus, there is the problem of moving the upper platen at the beginning and end of the cooking cycle. In order to facilitate timed cooking, the two-sided cooking apparatus is desirably arranged to automatically raise the upper platen at the end of a cooking cycle to stop cooking by the upper platen and enable removal of the cooked products from the lower platen.

U.S. Pat. No. 4,444,074 discloses a conveyor type two-sided cooking apparatus in which the upper platen is power operated to a raised position. A conveyor advances a group of hamburger patties onto the lower platen and stops and the upper cooking platen is then allowed to drop by gravity onto the upper side of the group of patties on the lower platen. Platen stops are provided to control the minimum spacing of the upper platen relative to the lower platen during cooking, to prevent excessive compaction of the cooked patties. After the patties are cooked on both sides, the upper platen is power operated back to its raised position generally paralleling the lower platen and the conveyor is then operated to move the cooked patties off the lower cooking platen. Such conveyor type two-sided cooking apparatus are special purpose machines usable only for cooking certain food products such as hamburger patties that can be advanced by a conveyor onto and off from the lower cooking platen and they are not adapted to alternative use as a single surface grill.

Various clamshell type two-sided cooking apparatus have also been made in which the upper cooking platen is mounted on a platen support arm for swinging movement about a horizontal axis between a lower cook position and a raised position, and automatically raised at the end of a timed cooking cycle. Some prior art clamshell grills such as disclosed in U.S. Pat. Nos. 2,009791; 4,008,067 and 4,165,682 used counterbalance means to assist raising of the upper platen and in U.S. Pat. No. 4,483,239 the upper platen is power operated to a raised position by a pneumatic cylinder at the end of a timed cooking cycle. In some prior clamshell grills, the upper platen is pivotally mounted on the platen support arm for tilting movement about a horizontal axis relative to the platen support arm to rest the upper surface of the food products. In U.S. Pat. Nos. 2,632,379 and 4,483,239, the upper platen is rigid with the platen support arm and spacing of the upper platen relative to the lower platen during cooking is effected by vertically adjusting the pivot at the rear of the platen support arm and adjusting an arm stop at the distal end of the platen support arm. Clamshell grills have also been made with a plurality of upper platen stop pins adjustably mounted on the upper platen and extending downwardly through the cooking face of the upper platen for engagement with the upper face of the lower platen to control the space therebetween. However, the stop pins limited the usable cooking area on the upper and lower platens and made it difficult to clean the upper platen. Further, the stop pins were in the cooking area and heated by direct contact with the cooking platens, and grease and other debris normally created by cooking hamburgers and the like tended to bake on the stop pins and impede their adjustment.

SUMMARY OF THE INVENTION

The present invention relates to clamshell type cooking apparatus having a lower cooking platen fixedly mounted on a support structure and an upper cooking platen mounted on a platen support arm for swinging movement about a horizontal pivot axis between a lower cook position and a raised inoperative position.

It is the object of the present invention to provide an improved clamshell type grill apparatus which effectively accommodates variation in initial thickness of the individual patties of the group being cooked; accommodates a decrease in thickness of the patties that occurs during cooking; accommodates different groups of patties of nominally different thickness; and is adapted to raise the upper end of a timed cooking cycle to stop cooking by the upper platen and enable removal of the cooked products from the lower platen.

Accordingly, the present invention provides a clamshell grill in which the platen support arm and upper platen are yieldably biased by counterbalance means to a raised position and the platen support arm and upper cooking platen are adapted to be manually lowered against the counterbalance force. An arm stop on the distal end of the platen support arm is provided to engage a fixed arm stop abutment at the forward side of the support structure when the platen support arm is in its lower position, and a pneumatic clamp cylinder is operated when the arm is moved to its lower position to apply a force to the arm in a direction and magnitude to overcome the counterbalance force and yieldably press the arm stop against the arm stop abutment and thereby hold the arm in a fixed position over the lower platen. The upper platen is mounted on the platen support arm for limited floating movement relative to the arm in a direction perpendicular to the upper platen to accommodate variations in product thickness and product shrinkage during cooking, and platen stops are provided on the platen support arm and arranged to engage platen stop abutments that are attached to and spaced above the upper platen to limit downward movement of the upper platen relative to the support arm to a preset lower position and thereby control the minimum spacing of the upper platen from the lower platen and the final product thickness.

These, together with other objects, features and advantages of this invention will become apparent from the following detailed description when taken in connection with the accompanying drawings wherein:

Figure 4:
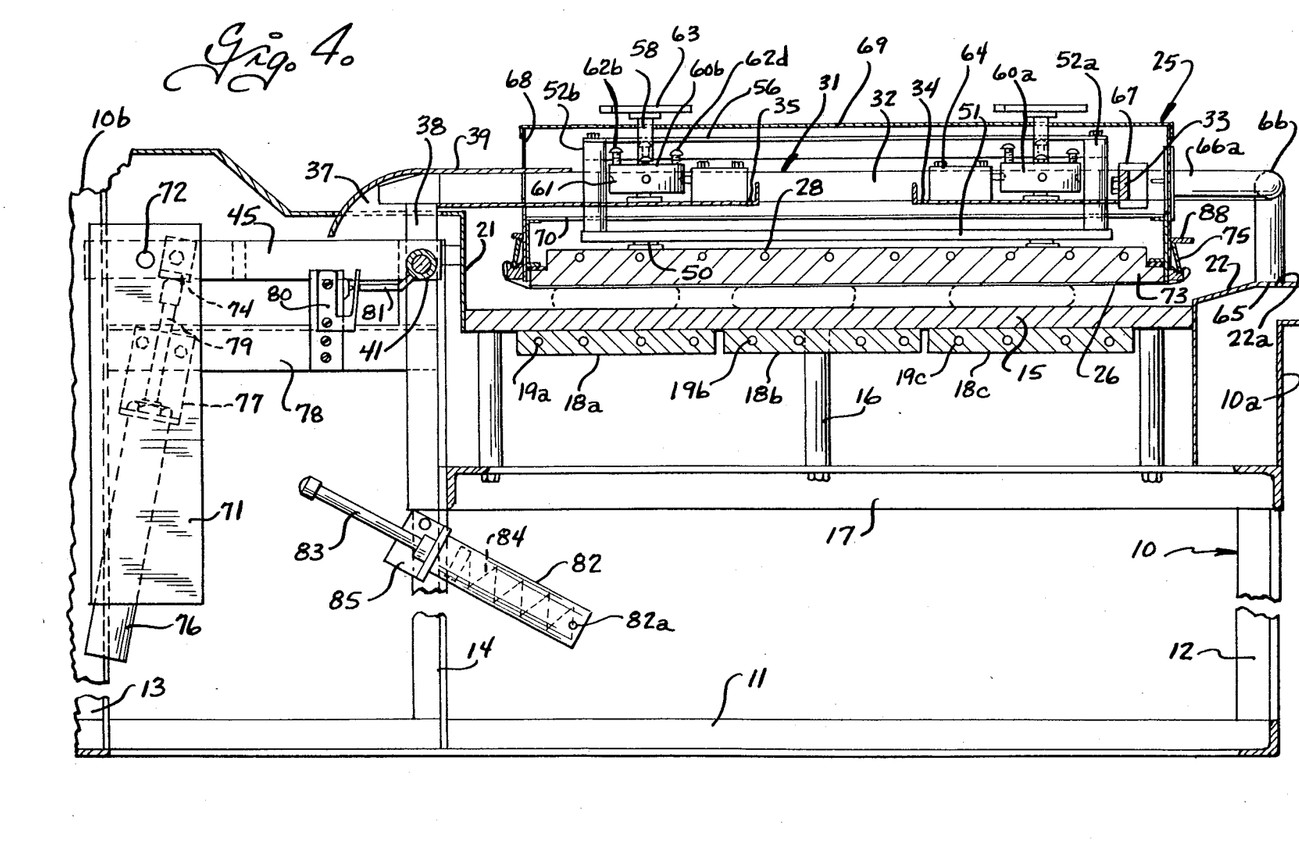
FIG. 4 is a longitudinal sectional view taken on the plane 4—4 of FIG. 3.

The cooking apparatus comprises a rigid support structure 10 having a front 10a and a rear 10b. As best shown in FIG. 4, the support structure is conveniently in the form of a rigid weldment including base frame members 11, front uprights 12, rear uprights 13 and intermediate uprights 14 adjacent the rear of the support structure. A lower cooking platen 15, formed of a heat conducting material such as steel plate, is mounted as by posts 16 on generally horizontal frame members 17 that extend between the front and intermediate uprights 12 and 14. The lower grill platen has smooth flat upper cooking surface 15a and is heated by heaters which may be of the electrical or gas type if desired. In the embodiment shown, three heaters, conveniently formed of cast aluminum and designated 18a–18c are attached as by bolts to the underside of the lower cooking platen 15 and electrical heating elements 19a–19c are provided in the heating units 18a–18c respectively. A splash guard 21 is provided at the rear of the lower cooking platen and a front cross-member 22 is provided on the support structure at the front side of the lower cooking platen. The front cross-member 22 is constructed and arranged to provide a rigid upwardly facing arm stop abutment 22a at the front side of the support structure and the cross member is herein shown formed of heavy gauge metal with a generally U-shaped cross section.

Figure 1:
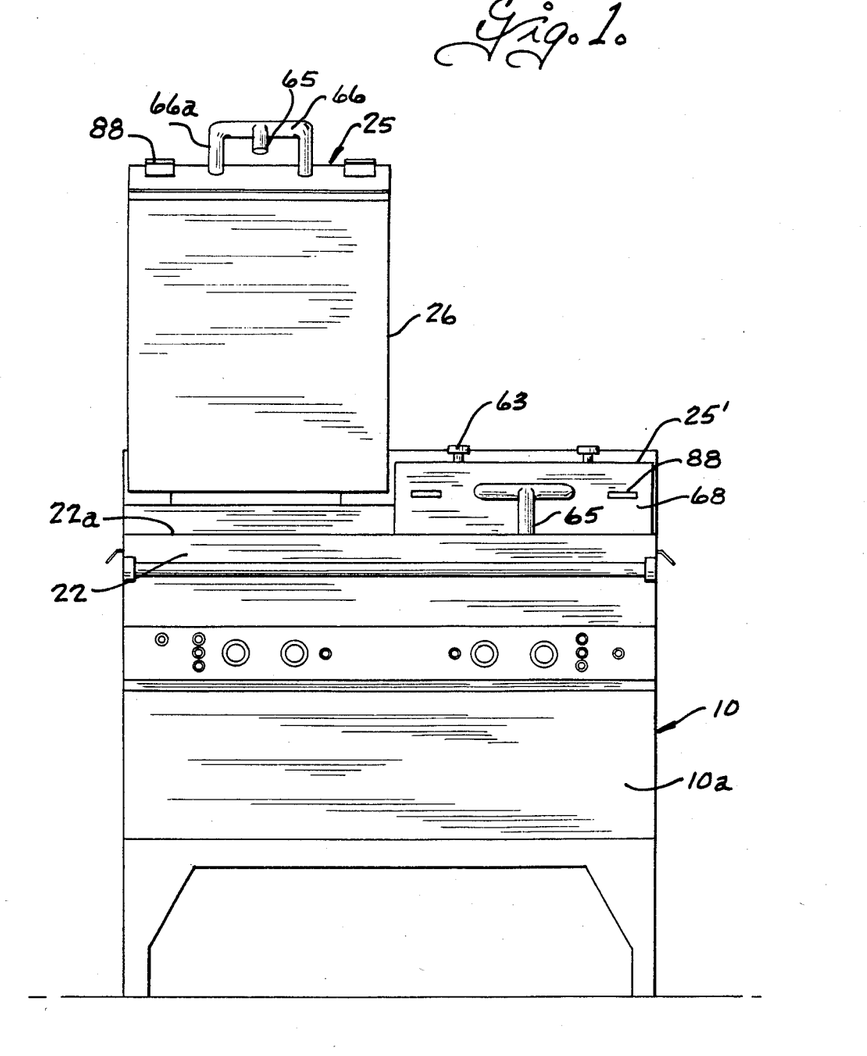
FIG. 1 is a front view of the cooking apparatus having dual upper cooking platens, and with one upper cooking platen in a raised position.

In the embodiment illustrated, the lower cooking platen 15 is made relatively wide, for example of the order of three feet or more, to provide a large cooking surface and two movable upper platen assemblies designated 25 and 25' in FIG. 1 are provided to cooperate with different areas of the lower cooking platen. As best shown in FIG. 1, the upper cooking platen assemblies 25 and 25' are disposed in side-by-side relation and each have as width slightly less than one-half of the width of the lower cooking platen. The upper cooking platen assemblies 25 and 25' are of like construction and like numerals are used to designate corresponding parts. Alternatively, a single upper cooking platen assembly could be used, if desired.

Each upper platen assembly includes an upper cooking platen 26 formed of a heat conducting material such as cast aluminum plate with a flat smooth cooking surface at the underside and electrical heating elements 28 cast into the upper cooking platen.

Figure 2:
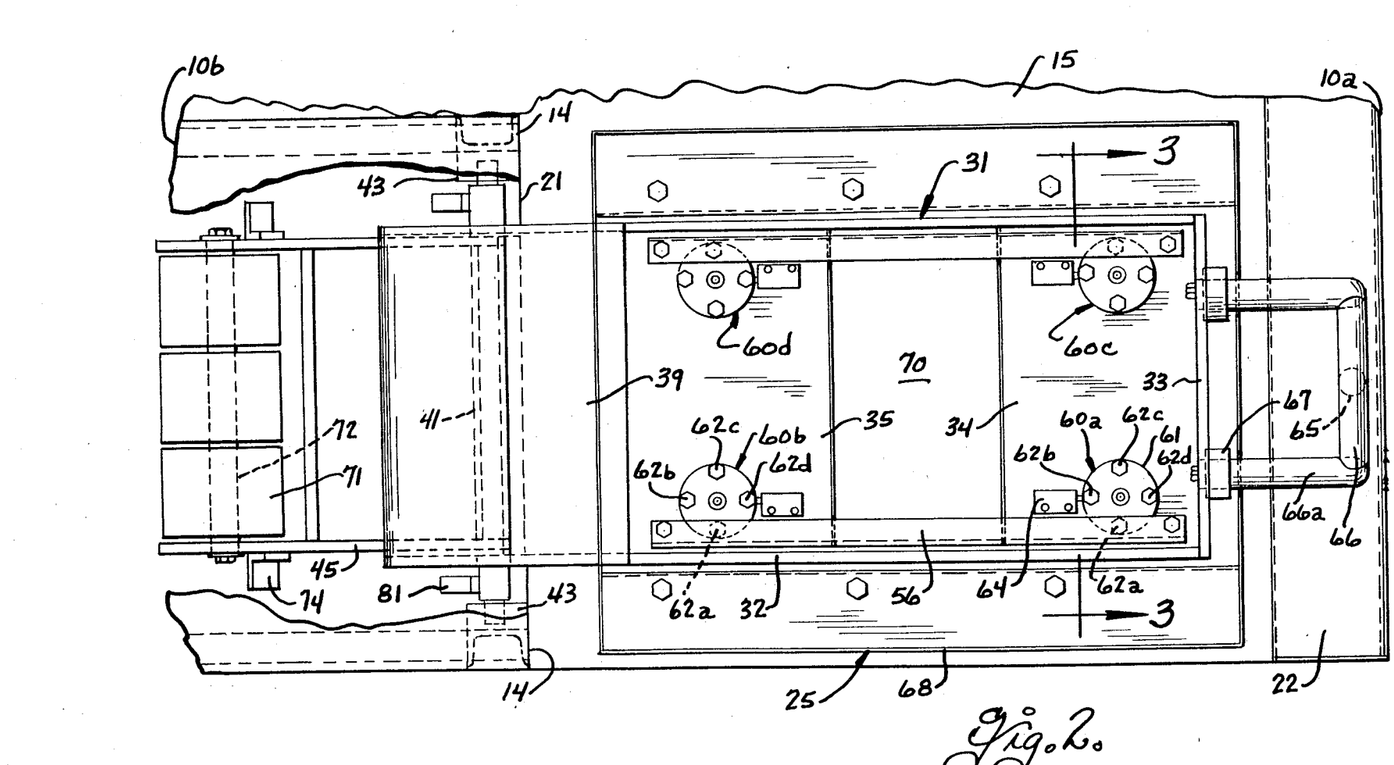
FIG. 2 is a fragmentary horizontal sectional view through the upper cooking platen taken on the plane 2—2 of FIG. 4.
Figure 5:
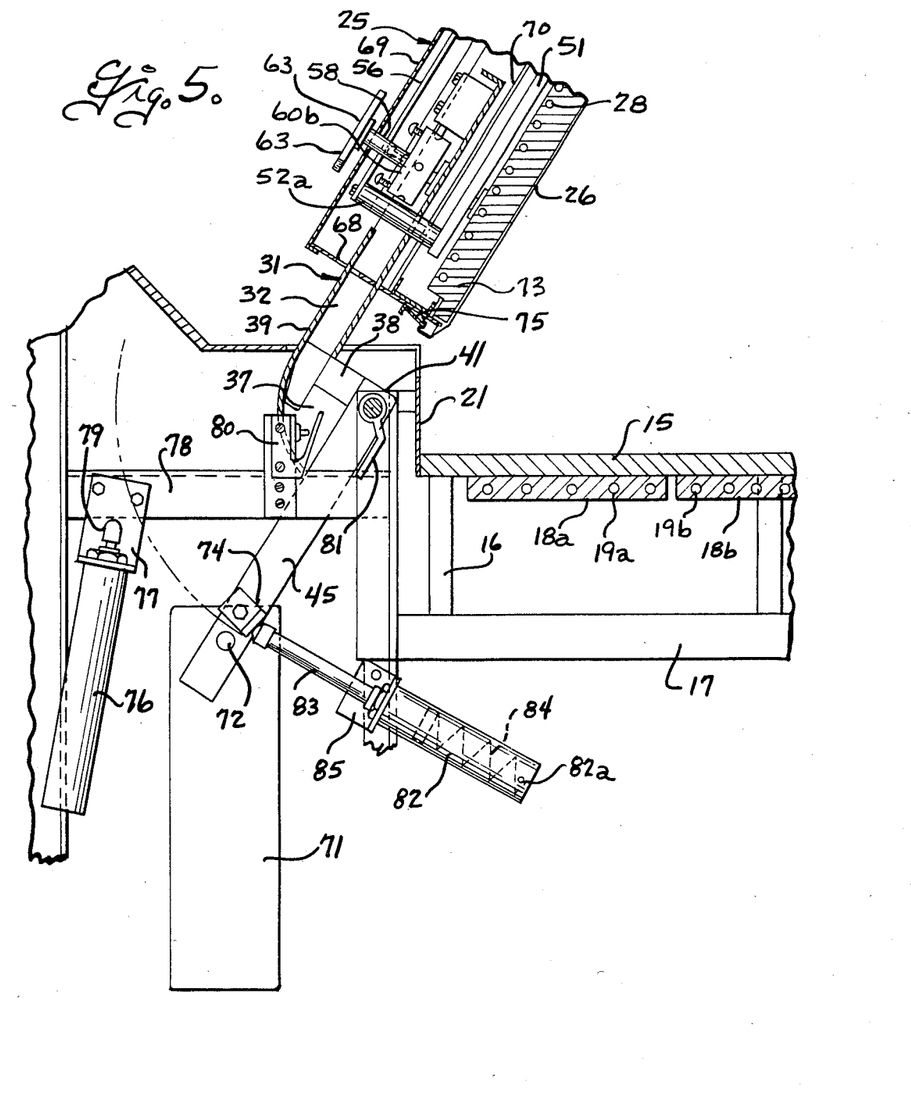
FIG. 5 is a fragmentary longitudinal sectional view taken on the plane 4—4 of FIG. 3 and illustrating the upper platen in a raised position.

The upper platens 26 are each mounted on a rigid platen support arm 31 for swinging movement about an axis adjacent the rear of the support structure between a lower cook position as shown in FIG. 4 and a raised position as shown in FIG. 5. Each platen support arm 32 is conveniently a rigid weldment formed by a pair of side bars 32 that are interconnected at their forward ends by a cross bar 33 and which are also interconnected intermediate their ends by plates 34 and 35. The side bars 32 are rigidly connected at their rear ends by sector plates 37 and members 38 to a cross shaft 41, and an upper cover plate 39 is welded to the upper side of the rear portions of the side bars 32 and has a rear portion that curves down in an arc concentric with the cross shaft 41 and welded to the sector plates 37. As best shown in FIGS. 4 and 5, the cross shaft 41 is offset below the rear ends of the side bars 32 adjacent the plane through the upper cooking platen. The ends of the cross shaft 41 and sector plates 37 are mounted as by anti-friction bearings 43 (FIG. 2) on the intermediate uprights 14, to support the platen support arm for swinging movement about the axis of the shaft 41 adjacent the rear of the lower cooking platen. Operating arms 45 are secured as by welding to the cross shaft 41 and extend from the cross shaft in a direction generally opposite the platen support arm 31 and are preferably arranged to be disposed generally horizontal when the platen support arm is in its lower position as shown in FIG. 4. An arm stop 65 is rigidly secured to the forward end of the platen support arm 31 and arranged to engage the upwardly facing arm stop abutment 22a formed by the upper face of the cross member 22 at the front of the support structure to limit downward movement of the platen support arm to a fixed lower position. As best shown in FIGS. 2 and 4, the arm stop 65 is conveniently formed integrally with a generally U-shaped handle member 66. The handle member has legs 66a that are rigidly secured in sockets 67 on the forward cross member 33 of the platen support arm, and the arm stop 65 extends downwardly from the intermediate portion of the U-shaped handle member. Thus, the arm stop 65 on the forward end of the platen support arm engages the forward cross member 22 on the support structure to limit downward movement of the platen support arm to a fixed lower position as shown in FIG. 4.

Figure 3:
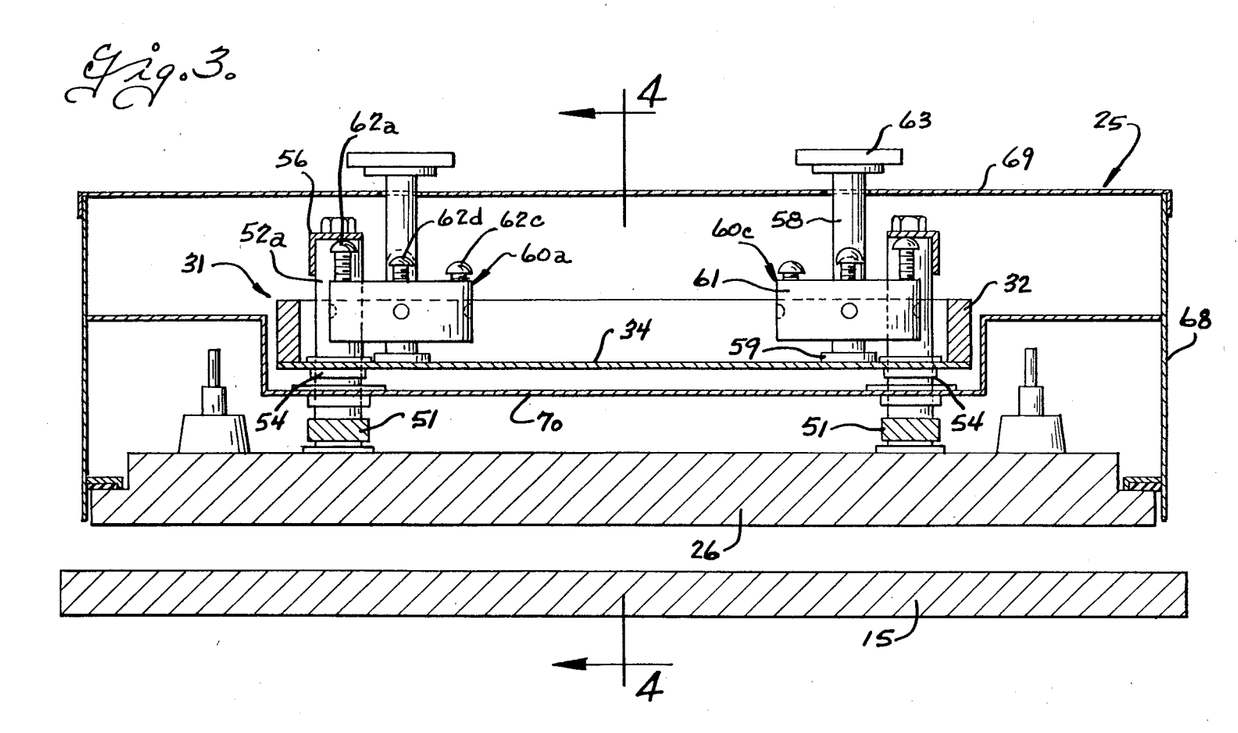
FIG. 3 is a fragmentary transverse sectional view taken on the plane 3—3 of FIG. 2, and illustrating the parts on a larger scale than FIG. 2.

Each upper cooking platen 26 is mounted on the respective platen support arm 31 for floating movement relative thereto in a direction perpendicular to the lower cooking face of the upper platen. For this purpose, a pair of mounting bars 51 are attached as by shoulder bolts 50 to the upper side of the upper heating unit 27 and the bars 51 are preferably spaced from the upper side of the heating unit 27, except that the points of attachment thereto, to reduce heat transfer from the heating unit to the bars. As best shown in FIGS. 3 and 4, the bars 51 extend from adjacent the rear to adjacent the front of the upper platen and are spaced equally from the opposite sides of the front-to-rear centerline of the upper platen. Forward and rear guide posts 52a and 52b are attached to each of the bars 51, preferably at locations spaced on the shoulder bolts to reduce heat transfer to the posts, and the four guide posts slidably extend through guides 54 in the forward and rear plates 34 and 35 on the platen support arm. Abutment bars 56, conveniently of angle iron, are secured as by bolting to the upper ends of the forward and rear guide posts and extend therebetween. The abutment bars 56 define downwardly facing platen abutment means at their underside and four adjustable platen stops 60a-60d are mounted on the platen support arm and arranged to engage the downwardly facing platen abutment means to limit downward movement of the upper platen relative to the support arm to a preset lower position, while allowing limited floating movement of the upper platen relative to the support arm above that lower position. The adjustable platen stops each include an upright shaft 58 that is rotatably supported at its lower end in a bushing 59 (FIG. 3) attached to one of the plates 34, 35 of the platen support arm, and a turret 61 non-rotatably secured as by bolts to the shaft. Each turret has a plurality of adjustable stop members, one for each of the different thickness products to be cooked and herein shown four in number and designated 62a-62d. The stop members 62a-62d are threadedly mounted on the turret for adjustment in a direction parallel to the axis of the shaft 58 and have heads at their upper ends for engaging the platen abutment stops. A knob or handle 63 is non-rotatably secured on the upper end of each shaft 58 to enable rotating the shaft to position a selected one of the adjustable stop members 62a-62d under the platen abutment means formed by the bars 56. The four platen stops 60a-60d are arranged in a generally rectangular pattern respectively adjacent the left front, left rear, right front and right rear of the upper platen to enable individual adjustment of the lower position of the upper platen at those locations. The platen stops 60a-60d can be rotated when the upper platen is manually lifted relative to platen support arm as by handle 88, to position corresponding ones of the stop members in an operative position below the associated abutment means. Detent means 64 are provided for each platen stop to releasably retain the associated platen stop at the different rotational positions at which the stop members 62a-62d are operative to engage the associated abutment means. Thus, stop members 62a on the four platen stops can be individually adjusted to uniformly space the upper platen a first distance from the lower platen and the corresponding ones of the other stop members on the other platen stops can be individually adjusted for a different platen spacing. With this arrangement the upper platen is supported for limited floating movement relative to the support arm so that it can rest by gravity on the products being cooked, with the downward movement of the upper platen relative to the platen support arm limited by corresponding ones of the adjustable stop members 62a-62d on the platen stops to control the thickness of the cooked product.

Each upper platen assembly 25, 25' includes a platen housing having a side wall 68 extending upwardly around the periphery of the upper platen 26 and a top wall 69 attached to the side wall at a level above the platen support arm to enclose the platen support arm and the top of the upper platen. The side wall 58 is attached by screws or the like to the edges of the upper platen and a heat shield 70 is mounted as by brackets 73 (FIGS. 4 and 5) on the side wall and extends between the side wall above the upper platen and below the platen support arm to minimize heat radiation from the upper platen to platen support arm, platen stops and the top wall 68 of the platen housing. The side wall has vertically elongated openings at the front to allow the legs 66a of the handle to extend therethrough and the top wall has openings to allow the shafts 58 of the platen stop to extend upwardly therethrough. The heat shield 70 has openings 70a to allow the guide posts 52a-52d to pass upwardly therethrough. The lower cooking surface of the upper platen is preferably covered with an anti-stick coating, preferably in the form of a removable platen cover sheet formed of non-stick material such as "Teflon" or the like and, as shown in FIG. 4, the platen cover sheet is detachably secured by clamps 75 at the front and rear of the upper platen assembly.

The platen support arm 31 is yieldably biased away from its lower position shown in FIG. 4 toward its raised position shown in FIG. 5 by counterweights 71 pivotally attached as by a rod 72 to the operating arms 45 at a location spaced rearwardly from the cross shaft 41. The weights 71 are selected so as to normally bias the platen support arm and the upper platen away from its lower position to its raised position and such that only a small force on the handle is required to pull the support arm and upper platen to its lower position. As the platen support arm approaches its lower position, a pneumatically operated clamp is provided and arranged to press the platen support arm downwardly to its lower position with a force sufficient to overcome the counterbalance force of the weights 71, and to press the stop arm 65 firmly against the cross member 22 on the support structure. For this purpose, an abutment 74 is provided on at least one and preferably both of the operating arms 45 at locations spaced from the pivot shaft 41 and such that abutments are movable in an arcuate abutment path as the platen support arm is moved between its lower cook position and its raised position. Pneumatically operated clamp cylinders 76 are mounted as by brackets 77 on frame members 78 of the support structure and the clamp cylinders have plungers 79 that are movable along a linear plunger path that intersects the arcuate path of travel of the respective abutment 74 when the platen support arm is in its lower position. The plungers of the pneumatic clamp cylinders are normally in the retracted position as shown in FIG. 5 and means are provided for actuating the clamp cylinders when the platen support arm approaches its lower cook position to move the plunger from its retracted position shown in FIG. 5 in which it is spaced from the arcuate abutment path as shown in FIG. 5 to an extended position engaging the abutment means 74 as shown in FIG. 4. The size of the pneumatic clamp cylinders and the pressure of the fluid applied thereto is arranged so that the pneumatic clamp cylinder is operative, when actuated, to press the plungers against the abutments 74 with a force sufficient to overcome the counterbalance force of the counterweights 76 and to press the platen support arm to its lower cook position with the arm stop 65 firmly engaging the cross member 22. As best shown in FIGS. 4 and 5, a switch 80 is mounted on the support structure and arranged to be engaged by a switch actuating arm 81 that is movable with the platen support arm, when the platen support arm approaches its lower position shown in FIG. 4. Switch 80 is arranged in a manner described more fully hereinafter to control actuation of the pneumatic clamp cylinders when the platen support arm approaches its lower position, and a means is provided for de-actuating the clamp cylinders at the end of a cooking cycle to allow the counterweights to move the platen support arm and upper platen from its lower to its raised position. The cooking apparatus advantageously has its own compressed air supply and, as diagrammatically shown in FIG. 6, air is supplied to the clamp cylinders from an air compressor 117 to a compressed air storage tank or accumulator 121, through an adjustable pressure regulator 125 and flow reversing valve 126 to the clamp cylinder 76.

A shock absorbing means is advantageously provided to cushion movement of the platen support arm and upper platen as it approaches its raised position. The shock absorbing means is preferably in the form of a dash pot having a cylinder 82 and a plunger 83 yieldably urged by a spring 84 to an extended position shown in FIG. 4. The dash pot is mounted as by a bracket 85 on the support structure at a location such that the plunger intersects the arcuate path of travel of the abutment 74 on the operating arm 45 and engages the abutment as the platen support arm approaches its raised position as shown in FIG. 5. As is conventional in such dash pot type shock absorbers, the cylinder has a means such as restricted bleed orifice 82a to restrict the rate of flow of air from the cylinder 82 and hence control the rate of movement of the plunger 83 when it is engaged by the abutment 74. Since the plunger 83 is not fixed to the operating arm 45, it does not impede downward movement of the platen support arm and platen to its lowered position and does not affect raising of the upper platen until the upper platen approaches its fully raised position.

Figure 6:
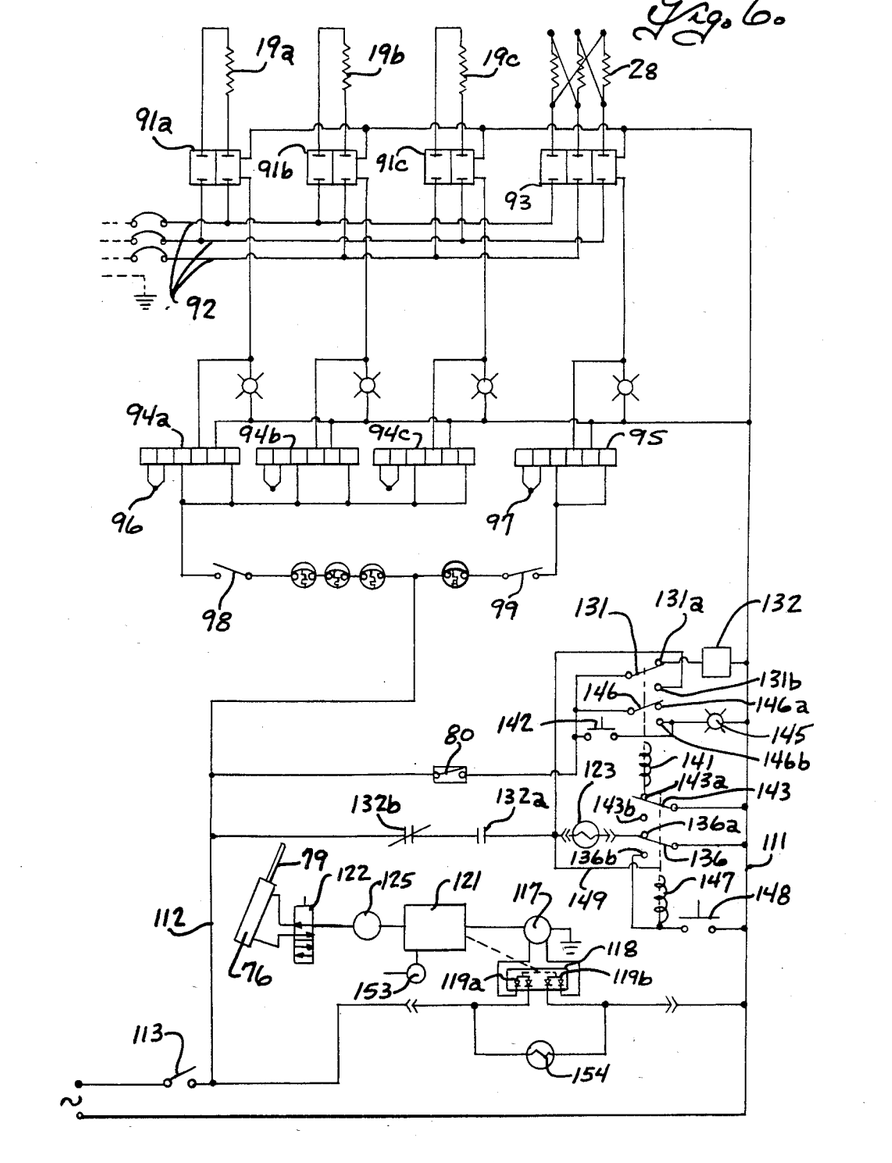
FIG. 6 is a schematic diagram of the electrical controls for the cooking apparatus.

Reference is now made more specifically to the schematic electrical diagram shown in FIG. 6. The cooking apparatus is advantageously arranged to enable cooking on either the left side or the right side or both sides of the lower cooking platen and with either the left or the right or both of the upper cooking platens. Separate electrical heaters and controls are provided for each side of the unit and the controls for only one side of the unit are shown in FIG. 6, it being understood that like controls are provided for the other side of the unit. The electrical heating elements 19a–19c for each side of the lower cooking platen are connected through respective mercury relays 91a–91c to power supply conductors 92 and the heating elements 28 for the associated upper cooking platen are connected through mercury relay 93 to the power supply conductors 92. Mercury relays 91a–91c are controlled by temperature controllers 94a–94c respectively, each having a temperature sensing element or thermocouple 96 that is responsive to the temperature of the associated heater 91a–91c. Mercury relay 93 is controlled by a temperature controller 95 having a temperature sensing element 97 responsive to the temperature of the upper cooking platen. Temperature controllers 94a–94c are selectively operated under the control of a manually operated bottom heat switch 98 and temperature controller 95 for the upper platen is selectively operated under the control of a manually operable top heat switch 99.

A control circuit including conductors 111 and 112 is connected through a normally open selectively operable switch 113 to a power supply such as 115 volt supply and conductor 112 is connected to the normally open bottom heat switch 98 and top heat switch 99 to supply power to the temperature controllers when the switch 113 is closed. The motor for air compressor 117 is connected through contacts 119a, 119b of pressure operated switch 118 to control circuit conductors 111 and 112 so that the air compressor 117 is energized under the control of the pressure operated switch. Compressor 117 supplies air under pressure to the pressurized storage tank 121 and pressurized air from the storage tank is delivered through pressure regulator 125 and flow reversing valve 122 to the clamp cylinder 79. Pressure switch 118 is connected so as to be responsive to the pressure in the storage tank 121 and is arranged to open the switch contacts 119a, 119b when the pressure in the storage tank reaches a preselected upper level to stop the compressor. Valve 122 is operated by an electro-responsive actuator or solenoid 123 and is operative when the solenoid is de-energized to supply air under pressure from the tank 121 to the upper end of the clamp cylinder 79 to retract plunger 79a. Valve 122 is operative when the solenoid 123 is energized, to supply fluid pressure to the lower end of the clamp cylinder while exhausting fluid pressure from the upper end of the clamp cylinder, to thereby extend the clamp cylinder. The pressure regulator 128 is provided in the pressurized air supply line to regulate the pressure supplied to the clamp cylinder and hence to control the clamping force applied by the clamp cylinder to the upper platen support arm. A normally open dump valve 153 is connected to the compressed air supply and is operated to its closed position when the dump solenoid 154 is energized. Solenoid 154 is energized to close the dump valve 153 when the control switch 113 is closed and is deenergized when the switch 113 is opened to open dump valve 153 for cleaning the pneumatic system.

As previously described, switch 80 is normally open and is arranged to be operated to its closed position by a switch actuating arm 81 on the cross shaft 41 when the upper platen is lowered to its cook position. Switch 80 is connected through relay operated switch 131 and normally closed contact 131a to an adjustable cook timer 132 to energize the cook timer when the switch 80 is closed. Cook timer 132 is operative, when energized, to immediately close normally open cook timer contacts 132a and to open normally closed cook timer contacts 132b after a preselected selectively adjustable cook time interval. Cook timer contacts 132a and 132b are connected in series with the valve actuating solenoid 123 and the solenoid 123 is otherwise connected through the normally closed contact 136a of relay operated switch 136 to the other control circuit conductor 111. Thus, solenoid 123 will be energized to actuate valve 122 to a position to extend the clamp cylinder when the cook timer 132 is initially actuated in response to closing of switch 80, and the solenoid 123 will be de-actuated when normally closed cook timer contact 132b is opened after a preselected cook time interval. Opening of cook timer contact 132b de-energizes the valve operating solenoid 123 to allow valve 122 to return to the position shown in FIG. 6 and retract the clamp cylinder plunger 79a. The upper platen then moves to its raised position under the yieldable bias of the counterweights.

In the event there is going to be a substantial time interval between successive cooking cycles, it is desirable to clamp the upper cooking platen in its lower position in order to reduce heat loss to the atmosphere from the upper and lower cooking platens during this time. Relay operated switch 131 is operated by an electroresponsive actuator 141 from a position engaging relay contact 131a to a position engaging relay contact 131b, when the actuator 141 is energized. Actuator 141 is connected through a normally open manually operable standby switch 142 to the switch 80 and is also connected through normally closed relay contact 143a of relay operated switch 143 to the control circuit conductor 111. Thus, when the platen support arm is moved to its lower position and closes switch 80, the cook timer 132 will be actuated in the manner previously described to establish a circuit to the electroresponsive actuator 123 for the valve 122 and thereby actuate the clamp cylinder. Manually operable standby switch 142 can then be moved to its closed position in which it energizes relay 141 to move the relay switch 131 out of engagement with contact 131a to disable the timer and into engagement with contact 131b that is connected to the valve actuating solenoid 123 to maintain the solenoid actuated and thereby hold the platen support arm in its lower position in a standby condition. An indicator light 145 is connected to the standby switch to indicate when the relay 141 is energized, and relay 141 is arranged to operate a second relay operated switch 146 from a position engaging contact 146a to a position engaging a contact 146b that is connected to the indicator light, to maintain the indicator light 145 energized while the unit is in a standby condition.

An override relay 147 is connected through normally opened manually operable override switch 148 to control circuit conductor 111 and through a conductor 149 and 151 to the contact 131b of relay operated switch 131. Override relay 147 is operative when energized to move relay operated switch 143 out of engagement with contact 143a and into engagement with contact 143b and to also move relay operated switch 136 out of engagement with contact 136a and into engagement with contact 136b connected to the relay 147. Thus, when override switch 148 is closed, it will interrupt the circuit to standby relay 141 to allow relay switch 141 to move back into engagement with contact 131a. In addition, it opens the circuit from the valve actuating solenoid 123 to the control conductor 111 to de-actuate the solenoid 123 and allow the upper platen to move under the bias of the counterweights to its raised position. As will be seen from FIG. 6, override solenoid 149 is also connected through conductor 149 and timer operated relay contacts 132a and 132b to the control circuit conductor 112 so that the valve 123 for operating the clamp cylinder can be de-actuated if necessary or desirable during a timing cycle, by merely closing manually operable override switch 148.

From the foregoing it is believed that the construction and operation of the cooking apparatus will be readily understood. The electrical heaters 91a–91c in the lower cooking platen can be selectively energized under the control of bottom heat switch 98 and temperature controllers 94a–94c so that the cooking apparatus can be used as a single surface grill without energizing the upper cooking platen. For two sided grilling, the upper cooking platen is also energized under the control of bottom heat switch 99 and temperature controller 95.

The upper platen is normally biased to its raised position by counterweights and, after the food product such as hamburger patties are positioned on the lower platen, only a small force on the handle 66 is required to swing the platen support arm and upper platen to its lower cook position with the arm stop 65 engaging the cross member 22 on the support structure. When the upper platen support arm is moved to its lower position, the switch actuating arm 81 closes switch 80 and this establishes a circuit through relay operated switch 131 to the cook timer 132. Cook timer 132 immediately closes contacts 132a to energize the valve actuator 123 and actuate valve 122 to extend the clamp cylinder piston 79a into its clamp position as shown in FIG. 4 to press the platen support arm to its lower cook position. Cook timer opens normally closed contacts 132b after a preselected selectively adjustable cooking time interval to de-energize the valve actuator 123 and allow the valve 122 to move back to its position shown in FIG. 6 and thereby retract the clamp cylinder plunger. when the clamp cylinder is released, the counterweights move the platen support arm and upper platen back to its raised position.

Some food products such as hamburger patties, particularly when they are in a frozen condition, vary somewhat in thickness and the upper platen is supported on the platen support arm for limited floating movement in a direction perpendicular to the lower cooking surface of the upper platen so that the upper platen assembly rests by gravity on the upper surface of the food products when the platen support arm is in its lower position with the arm stop 65 engaging the arm stop abutment. The food products shrink somewhat as they are cooked and the upper platen can shift downwardly relatively to the platen support until it engages the platen stops 60a–60d. The platen stops 60a–60d control the minimum spacing between the upper platen and the lower platen to thereby control the final thickness of the cooked products.

When the platen support arm is in its lower position, it is supported at its rear on the cross shaft 41 and at its front by the arm stop 65 at a fixed position relative to the lower cooking platen and adjustment of the minimum cooking spacing of the upper platen relative to the lower platen is effected by adjusting the platen stops that limit downward movement of the upper platen relative to the platen support arm. The platen stops are disposed entirely above the upper platen so that the entire lower cooking face of the upper platen can be used for cooking and the platen cover sheet can extend the full width of the upper platen to cover the entire cooking surface of the upper plate. Further, since the platen stops do not engage or extend through the upper platen, they are not exposed to the meat residue, grease and other debris normally produced by the cooking of hamburgers and the like. Further, the adjustable stops and their handles are not heated by direct contact with either the upper platen or the lower platen so that the operating handles will remain at a relatively low temperature to enable adjustment of the platen stops even when the platens are heated.

The timer 132 is arranged to open contacts 132b after the preselected selectively adjustable cook time interval to de-energize the valve operating solenoid 123 and allow the plunger of the clamp cylinder to move to its retracted position so that the upper platen can raise under the bias of the counterbalance weights.

The clamp cylinder presses the platen support arm to its lower cook position with a force sufficient to overcome the counterbalance force and firmly press the arm stop against the arm stop abutment to accurately position the platen support arm in its lower cook position. However, the platen support arm and upper platen can be manually raised during a cooking operation or during standby by merely lifting the handle 66 until the switch 80 is de-actuated and allows the clamp cylinder to retract. Alternatively, override switch 148 can be selectively closed during a cooking operation or during standby to de-actuate the clamp cylinder 76 and allow the platen support arm to raise.

The embodiments of the invention in which an exclusive property or privilege is claimed are defined as follows:

1. A cooking apparatus comprising, a support structure having a front and a rear, a lower cooking platen means fixedly mounted on the support structure and having an upper cooking surface, platen support arm means pivotally mounted on the support structure for movement about a horizontal pivot axis adjacent the rear of the structure between a lower cook position extending generally horizontally above the lower cooking platen means and a raised position inclined upwardly from the lower cooking platen means, said support structure including a rigid member forwardly of the lower cooking platen means providing an upwardly facing arm stop abutment, arm stop means on the distal end of said platen support arm means engageable with said arm stop abutment on support structure for positively stopping downward movement of said platen support arm means at said lower cook, position, upper cooking platen means having a downwardly facing cooking surface, a plurality of spaced upright guide posts attached at their lower ends to the upper cooking platen means and extending upwardly therefrom, means on said platen support arm means guidably engaging said posts intermediate their ends and guiding said upper cooking platen means for limited floating movement relative to the platen support arm means in a direction perpendicular to the cooking surface on the upper cooking platen means, means attached to the posts defining downwardly facing platen abutment means spaced above the upper cooking platen means, a plurality of adjustable platen stop means mounted on the platen support means and engageable with the downwardly facing platen abutment means for limiting downward movement of the upper cooking platen means to a preselected lower position relative to the platen support arm means while allowing limited floating of the upper platen means upwardly from said preselected lower position, operating arm means rigidly connected to the platen support arm means, upper platen counterbalance means connected to said operating arm means for applying a yieldable counterbalance force sufficient to move the platen support arm means and the upper platen means from said lower to said raised position, operating arm abutment means on the operating arm means at a location spaced from said pivot axis and movable with the operating arm means in an arcuate abutment path as the platen support arm means is moved between its lower cook position and its raised position, pneumatic clamp cylinder means mounted on the support structure and having plunger means movable along a linear plunger path generally tangent to the arcuate abutment path and intersecting said arcuate abutment path at a location to engage said operating arm abutment means when the platen support arm means is in its lower cook position, means for actuating said clamp cylinder means to move the plunger means from a first position spaced from the arcuate abutment path to a second position engaging said operating arm abutment means and for deactuating said cylinder means to move the plunger means back to its first position, said pneumatic clamp cylinder means being operative when actuated to said second position to press the plunger means against the operating arm abutment means with force sufficient to overcome the counterbalance force and yieldably press the platen support arm means to its lower cook position with the arm stop means engaging the arm stop abutment.

2. A cooking apparatus according to claim 1 wherein said means for actuating said clamp cylinder means includes switch means operated in response to movement of said control arm means to its lower cook position.

3. A cooking apparatus according to claim 1 wherein said means for actuating said clamp cylinder means includes control switch means operated in response to movement of said platen support arm means to its lower cook position, selectively adjustable cook timer means operated by said switch means to start a cook timing cycle when said control switch means is operated, and means controlled by said cook timer means for actuating said clamp cylinder means at the start of the cook timing cycle and for deactuating said clamp cylinder means at the end of the cook timing cycle.

4. A cooking apparatus according to claim 3 including manually operable over-ride switch means, and means responsive to operation of said over-ride switch means during a cook cycle for selectively deactuating said clamp cylinder means.

5. A cooking apparatus according to claim 3 including manually operable standby switch means, and means operative in response to operation of the standby switch means while the control switch means is operated for deactuating the cook timer means and for actuating the clamp cylinder means to hold the platen support arm in its lower position in a standby condition.

6. A cooking apparatus according to claim 5 including manually operable over-ride switch means, means responsive to operation of the over-ride switch means during a cook timing cycle for selectively de-actuating said clamp cylinder means, and means responsive to operation of the over-ride switch means when the platen support arm means is in said standby condition for de-actuating said clamp cylinder means.

7. A cooking apparatus according to claim 1 wherein said means for actuating said clamp cylinder means includes control switch means operated in response to movement of said platen support arm means to its lower cook position, said platen support arm means being adapted to be manually lifted from its lower cook position against the yieldable force of said pneumatic clamp cylinder means to a position in which said control switch means de-actuates said pneumatic clamp means.

8. A cooking apparatus according to claim 1 including a housing having a marginal side wall means supported on said upper cooking platen means and extending upwardly therefrom and a cover mounted on the side wall means and spaced above the platen support arm means, and heat shield means extending between the side wall means and overlying the upper platen support arm means to inhibit heating of the control arm means from the upper cooking platen means.

9. A cooking apparatus comprising, a support structure having a front and a rear, a lower cooking platen means fixedly mounted on the support structure and having an upper cooking surface, platen support arm means pivotally mounted on the support structure for movement about a horizontal pivot axis adjacent the rear of the structure between a lower cook position extending generally horizontally above the lower cooking platen means and a raised position inclined upwardly from the lower cooking platen means, means adjacent the front of said support structure providing an upwardly facing arm stop abutment, arm stop means on the distal end of said platen support arm means engageable with said arm stop abutment for positively stopping downward movement of said platen support arm means at said lower cook position, upper cooking platen means having a downwardly facing cooking surface, means mounting the upper cooking platen means on the platen support arm means for limited floating movement relative to the platen support arm means in a direction perpendicular to the cooking surface on the upper cooking platen means, means on the upper cooking platen means defining downwardly facing platen abutment means spaced above the upper cooking platen means, a plurality of adjustable platen stop means mounted on the platen support mean and engageable with the downwardly facing platen abutment means for limiting downward movement of the upper cooking platen means to a preselected lower position relative to the platen support arm means while allowing limited floating of the upper platen means upwardly from said preselected lower position, operating arm means rigidly connected to the platen support arm means, upper platen counterbalance means connected to said operating arm means for applying a yieldable counterbalance force sufficient to move the platen support arm means and the upper platen means from said lower to said raised position, operating arm abutment means on the operating arm at a location spaced from said pivot axis and movable with the operating arm means in an arcuate abutment path as the platen support arm means is moved between its lower cook position and its raised position, pneumatic clamp cylinder means mounted on the support structure and having plunger means movable along a linear plunger path generally tangent to the arcuate abutment path and intersecting said arcuate abutment path at a location to engage said operator arm abutment means when the platen support arm means is in its lower cook position, means for actuating said clamp cylinder means to move its plunger means from a first position spaced from the arcuate abutment path to a second position engaging said operator arm abutment means and for deactuating said cylinder means to move the plunger means back to its first position, said pneumatic clamp cylinder means being operative when actuated to said second position to press the plunger means against the operating arm abutment means with force sufficient to overcome the counterbalance force and yieldably press the platen support arm means to its lower cook position with the arm stop means engaging the arm stop abutment.

10. A cooking apparatus according to claim 9 including shock absorbing dash-pot means mounted on the support structure and having a dash-pot plunger movable along a path generally tangent to the arcuate abutment path and intersecting the arcuate abutment path at a location to engage the operator arm abutment means when the platen support arm means approaches its raised position.

* * * * *

UNITED STATES PATENT AND TRADEMARK OFFICE
CERTIFICATE OF CORRECTION

PATENT NO. : 4,586,428
DATED : May 6, 1986
INVENTOR(S) : Lee E. Adamson

It is certified that error appears in the above-identified patent and that said Letters Patent is hereby corrected as shown below:

On the title page, (Item 73) assignee, "Special" should read -- Specialty --.

Claim 1, column 11, line 45, delete the comma after "cook".

Signed and Sealed this

Fifth Day of August 1986

[SEAL]

Attest:

*Attesting Officer*

DONALD J. QUIGG

*Commissioner of Patents and Trademarks*